Oct. 18, 1949.　　　　　G. A. DEAN　　　　　2,485,234
AIRCRAFT PROPELLER SPINNER ANTIICING SYSTEM
Filed April 19, 1944　　　　　　　　　　2 Sheets-Sheet 1
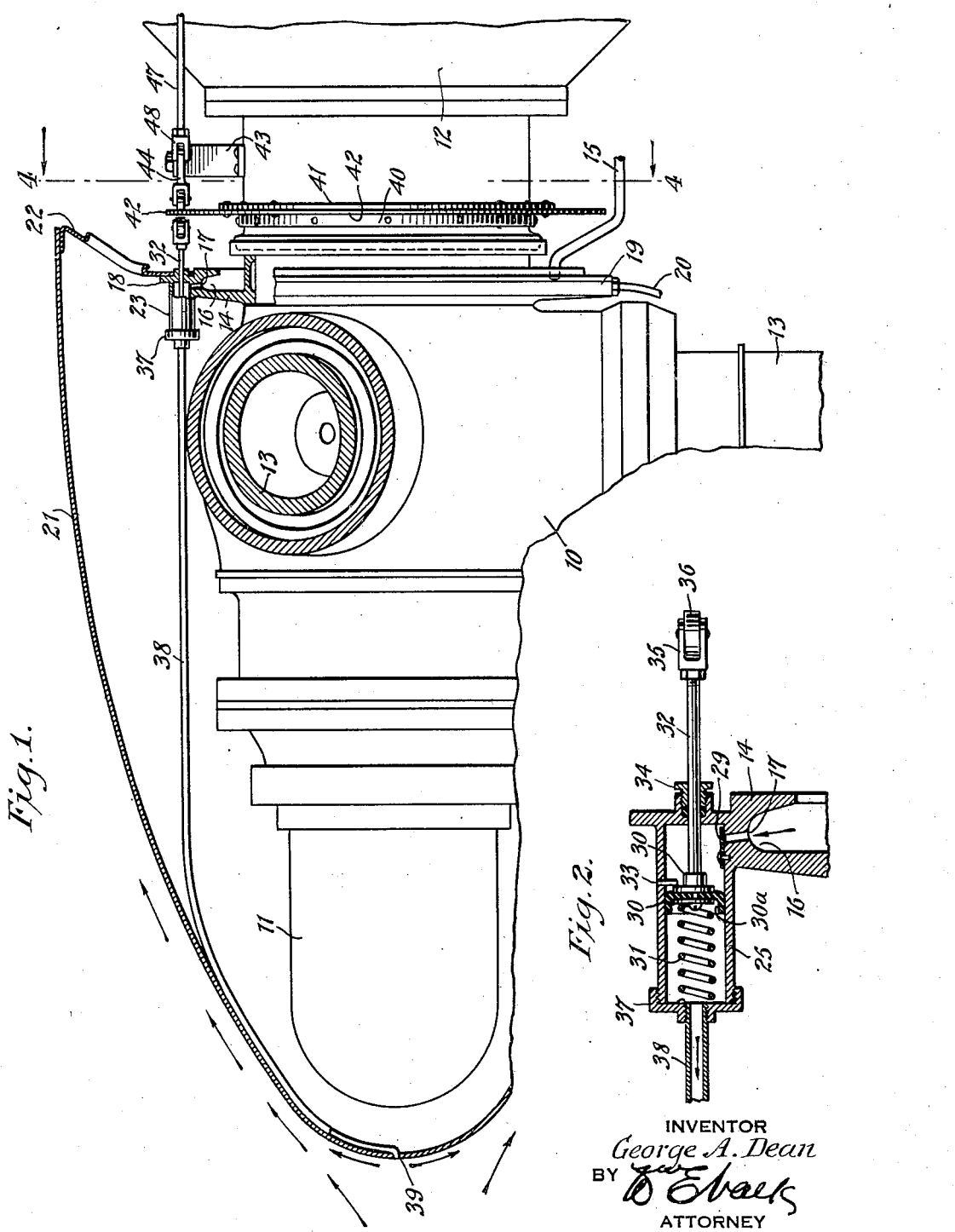
INVENTOR
George A. Dean
BY
ATTORNEY Oct. 18, 1949.  G. A. DEAN  2,485,234
AIRCRAFT PROPELLER SPINNER ANTIICING SYSTEM
Filed April 19, 1944  2 Sheets-Sheet 2

INVENTOR
George A. Dean
BY
ATTORNEY

Patented Oct. 18, 1949

2,485,234

UNITED STATES PATENT OFFICE 2,485,234

AIRCRAFT PROPELLER SPINNER ANTI-ICING SYSTEM

George A. Dean, Radburn, N. J., assignor to Curtiss-Wright Corporation, a corporation of Delaware Application April 19, 1944, Serial No. 532,025

10 Claims. (Cl. 244—134)

This invention relates to an anti-icing system for aircraft propeller assemblies and more particularly to a system which includes the protection of surfaces, which are revolvable with and adapted for streamlining such propeller assemblies, against the formation of ice thereon under unfavorable atmospheric conditions, simultaneously with the protection of the propeller blades against an icing condition, at the will of the pilot.

As is well known, aircraft propeller assemblies should be perfectly balanced; therefore, when a propeller spinner becomes loaded with ice, such loading causes an unbalanced condition which may result in failure both aerodynamically and structurally.

In the present invention, the principal object is to provide an improved anti-icing system for propeller assemblies wherein surfaces other than the blades may be effectively protected against the formation of ice thereon, when operating under unfavorable atmospheric conditions.

A further object of the invention is to provide an anti-icing system for propeller assemblies, wherein surfaces adapted to rotate with the propeller may be protected against an ice-forming condition simultaneously with the protection usually afforded to the propeller blades.

A further object of the invention is to provide an anti-icing system for propeller assemblies wherein a protective fluid is distributed to predetermined surface areas by centrifugal force and action of the slip stream.

With the above and other objects in view, the invention resides in the novel construction, combination, and arrangement of parts, the novel features of which are set forth with particularity in the appended claims. The invention itself, however, both as to its organization and its method of operation, together with additional objects and advantages thereof, will best be understood from the following description of a specific embodiment, when taken in connection with the accompanying drawing, in which:

Figure 1 is a fragmentary elevation partly in section of a propeller hub and spinner arrangement carried by an engine and illustrating the invention;

Fig. 2 is a fragmentary section of the pump structure;

Figure 3:
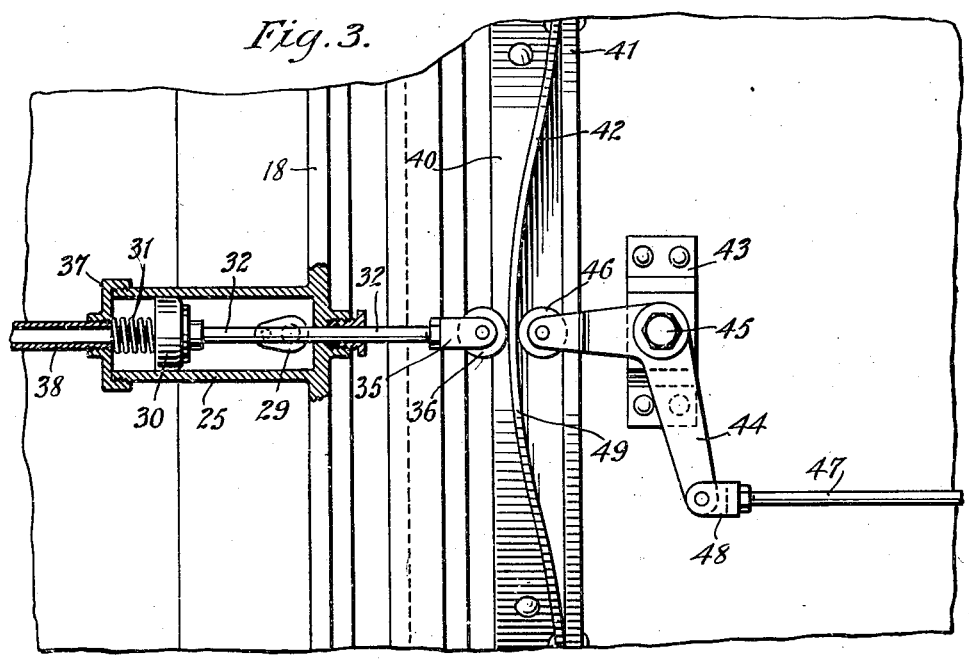
Fig. 3 is an enlarged elevation illustrating the manner of mounting the pump and the means for actuating the same.
Figure 4:
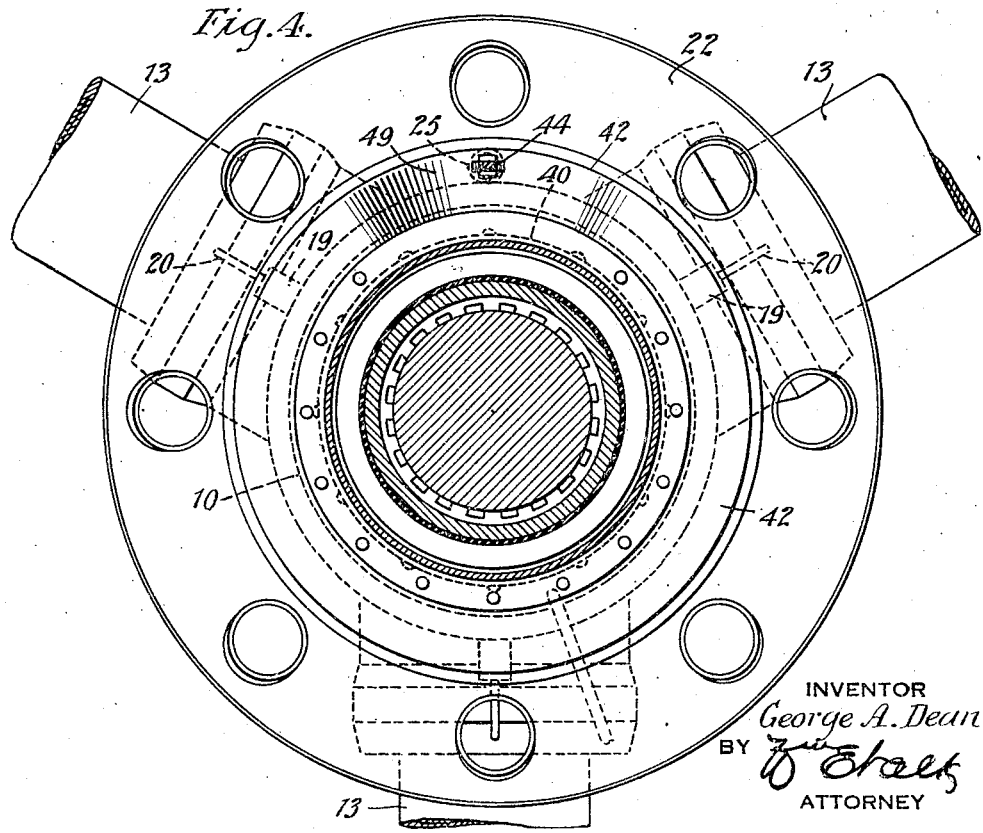
Fig. 4 is a section taken on the line 4—4 of Fig. 1.

Referring to Fig. 1 a propeller hub 10, including a power unit 11 is mounted in drivable relation upon a shaft extending from the front end of a conventional engine housing 12, the power unit 11 being adapted to selectively increase or decrease the pitch of a plurality of propeller blades in a well known manner, two of such blades being partially shown at 13.

A known form of slinger ring 14, usually associated with a blade anti-icing system, is secured on the rear end portion of the propeller hub 10 for rotation therewith, a conduit 15, adapted for introducing anti-icing fluid into an annular well or trough 16 formed within said slinger ring, being disposed in cooperative but non-contacting relation thereto.

The slinger ring 14 is provided with an orifice or outlet opening 17 which extends radially through the outer wall or rim of the slinger ring whereby fluid may flow under centrifugal force from the trough 16 through said outlet opening 17 and into a pump casing cooperatively associated with said slinger ring. The slinger ring is further provided with an integral flange 18 on and about its outer periphery, said flange 18 having formed therewith a plurality of equally spaced headers or risers 19 (one for each propeller blade) which are each provided with an internal, radially extending passage in communication with the trough 16, the outer end of each of said passages being suitably screw threaded for coupling a suitable spout or conduit 20 thereto whereby anti-icing fluid may flow onto the blades of a propeller assembly.

Ordinarily, it is highly desirable that the propeller hub 10 including the power unit 11 be streamlined. For this purpose a spinner housing 21 is utilized, said spinner housing being attached to and supported by a spinner bulkhead 22 in the form of a ring-like member which is mounted on the slinger ring 14 adjacent its rear edge, for rotation therewith.

A cylindrical plunger pump 23 is formed integrally with the flange 18 or is secured thereto.

As shown in Fig. 2, the pump cylinder 25 is provided interiorly with a flap valve 29 positioned over a passage which communicates with the opening 17, whereby fluid drawn into the said cylinder by the forward movement of a plunger or piston 30 will be retained in said cylinder upon the rearward or return movement of said piston. During the rightward stroke of the piston, fluid to the right of said piston causes a cup-like flexible washer 30a, comprising the piston 30, to contract whereby the fluid by-passes said washer and enters the leftward part of the cylinder 25. Thence it is forced out under the expanded action of the aforesaid flexible, piston-forming washer 30a when a piston rod 32 is moved leftwardly. The piston 30 is urged rightwardly by a spring 31. A stop pin 33, carried by and extending into said cylinder 25, limits the rightward movement of the plunger or piston 30, and also the piston rod 32, associated with said piston 30, whereby said rod 32 normally extends into the cylinder to clear the valve 29.

The piston rod 32 extends through the rear end of the pump cylinder 25, and through a gland or packing nut 34 associated therewith. A clevis bracket 35 having an anti-friction roller 36 pivoted therein is attached to the free end of the piston rod 32, and is actuated by a cam member hereinafter described.

The front or left end of the pump cylinder 25 is provided with a cap 37, adapted to serve as a closure for said cylinder, said cap 37 being provided with a central screw threaded aperture whereby a fluid directing conduit 38 is attached to said screw cap. As shown in Fig. 1, said conduit 38 extends forwardly within the spinner housing 21 and terminates in an aperture 39 formed in the axial center of the nose end of said spinner housing 21, whereby anti-icing fluid may be ejected under pressure forwardly of the nose end of said spinner housing during operation of the pump 23, and subsequently carried rearwardly over the exterior surface of the spinner housing 21 by the action of the slip stream during flight as indicated by the arrows.

With further reference to Fig. 1, mechanism for actuating the pump 23 at the will of the pilot will now be described. Accordingly, the front end portion of the engine housing 12 is provided with a suitably secured flanged ring 40, the flange 41 formed thereon being adapted for attachment thereto of a washer-like member 42 of relatively thin metal such, for example, as spring steel. The diameter of the washer-like member 42 is such that it serves as a cam-forming plate which may be flexed by a manually controllable member to bring a section thereof into contact with the anti-friction roller 36 associated with the free end of the piston rod 32.

The engine housing 12 is further provided rearwardly of an adjacent said cam-forming plate 42 with a bracket 43 adapted for the pivotal reception of a bell crank lever 44 by means of a suitable bolt 45, said bell crank lever 44 being preferably provided with an anti-friction roller 26, pivoted in a clevis formed in one leg thereof. The other leg of said bell crank lever 44 has a control rod 47 pivoted thereto by means of another clevis bracket 48. The control rod 47 is adapted to extend rearwardly into the pilot's compartment where it terminates in a suitable control lever (not shown) whereby the pilot may, under unfavorable atmospheric conditions, actuate said control lever to partially rotate the bell crank lever 44 and bring the roller 46 into rolling pressure contact with the cam-forming plate member 42 whereby to flex a portion thereof out of its normal plane as indicated at 49 and thus provide a cam-like surface shown in Fig. 3.

When the pump rotates relatively to the cam-forming plate member 42, by virtue of the rotation of the aforesaid propeller hub 10, the pump plunger rod 32 will periodically pass over the cam-like surface 49 whereby the pump 21 is actuated and anti-icing fluid is forced forwardly, outwardly and over the exterior surface of the spinner housing 21.

While one practical embodiment of the invention has been shown and described, it is to be observed that a pump piston 30 other than the cup-like washer 30a may be utilized. Thus, a known form of check valve may be associated with such alternative pistons whereby fluid in the inlet end of the pump 23 passes into the leftward or outlet end of the said pump under the influence of the piston moving rearwardly or into the position shown in Fig. 2.

In lieu of the cam-forming plate member 42 utilizable for forming a temporary cam surface 49 thereon, a suitable permanent cam plate may be employed and such a cam so disposed on the engine housing 12 that it may be moved along its axis into and out of engagement with the roller 36, by means of a suitable manually operable linkage system.

The pump is preferably, although not necessarily, of the plunger type. A known type of rotary pump is also adaptable for the purpose of this invention since a pinion or pulley, usually associated with a rotary pump, may be associated with and rotate on and about a fixed ring gear or pulley. Moreover, while one pump has been shown and described, it is to be understood that a plurality of such pumps may be utilized particularly where large amounts of fluid are to be pumped or where surface areas to be protected are such that one pump is insufficient.

Anti-icing fluid may be caused to traverse the conduit 15 and enter the slinger ring 14 under the control of selectively operable electric motor driven pump or the like. If desired, a control connection, not shown, may be extended from the control rod 47 to the switch last described so that the pilot, by a single operation, may cause anti-icing fluid to pass onto exterior surfaces of the propeller blades and exteriorly onto the spinner 21. Alternatively, the motor switch and the control rod 47 may be entirely disconnected from each other.

In the appended claims, the expression "anti-icing" shall be understood as referring to true anti-icing wherein the formation of ice is prevented. Further, the expression "anti-icing" shall be understood as referring to de-icing wherein ice is dissipated after its formation.

While the invention has been described with respect to a certain particular preferred example which gives satisfactory results, it will be understood by those skilled in the art, after understanding the invention, that various changes and modifications may be made without departing from the spirit and scope of the invention and it is intended therefore, in the appended claims to cover all such changes and modifications.

What is claimed as new and desired to be secured by Letters Patent is:

1. In combination, a propeller hub including a slinger ring and a spinner for said hub, means for feeding fluid to said slinger ring at will, a pump on the hub receiving fluid from said slinger ring, driving means for said pump operable in response to the rotation of said hub, means for feeding fluid from said pump to the exterior surface of said spinner upon rotation of said hub, and manually operable means for controlling said pump driving means.

2. In combination, a propeller hub, a non-deformable spinner for said hub, a pump secured to said hub to rotate therewith, a pipe extending from said pump forwardly through said spinner and communicating with the front exterior surface thereof, and means for actuating said pump to cause anti-icing fluid to traverse said pipe and engage said exterior surface of the spinner.

3. In combination, a propeller hub, a spinner for said hub, a pump secured to said hub to rotate therewith, a pipe extending from said hub forwardly through said spinner and communicating with the front exterior surface thereof, means for supplying anti-icing liquid to said pump, and means for actuating said pump to cause the anti-icing liquid to traverse said pipe and engage said exterior surface of the spinner.

4. In combination, a propeller hub, a spinner for said hub, a pump secured to said hub to rotate therewith, a pipe extending from said hub forwardly through said spinner and communicating with the front exterior surface thereof, means rotatable with said hub for supplying anti-icing liquid to said pump, and means for actuating said pump to cause the anti-icing liquid to traverse said pipe and engage said exterior surface of the spinner.

5. In an anti-icing system for a propeller having a spinner, an annular fluid receptacle on the hub, means to feed fluid thereto, ducts leading from said receptacle to the blades of the propeller for discharging fluid thereto for protection against icing, a duct leading from said receptacle to a forward portion of the spinner for fluid discharge to the exterior surface of the spinner, and controllable pumping means in said spinner duct to control fluid flow to the spinner independently of the fluid passing from said receptacle to said blades.

6. In an anti-icing system for a propeller having a spinner, an annular fluid receptacle on the hub, means to feed fluid thereto, ducts leading from said receptacle to the blades of the propeller for discharging fluid thereto for protection against icing, a duct leading from said receptacle to a forward portion of the spinner for fluid discharge to the exterior surface of the spinner, a pump in said spinner duct to urge fluid flow therethrough, and selectively operable means to control pump operation independently of fluid flow to said receptacle.

7. In an anti-icing system for a propeller having a spinner, means to feed fluid to said propeller including a fluid receptacle on the propeller, centrifugal-force-responsive means to feed fluid from said receptacle to the propeller blades, and independently operable pump means to feed fluid from said receptacle to the exterior surface of said spinner.

8. In an anti-icing system for a propeller spinner, a non-concentric source of de-icing liquid associated with and rotatable with said spinner, conduit means for said de-icing liquid leading to a point radially inward of said non-concentric source and externally of said spinner for distribution of said liquid on the exterior surface of said spinner, and pump means in said conduit means for overcoming centrifugal force in said conduit means to cause said liquid to flow from said source to said point.

9. In an anti-icing system for a propeller spinner, a non-concentric source of de-icing liquid associated with and rotatable with said spinner, conduit means for said de-icing liquid leading to a point radially inward of said non-concentric source and externally of said spinner for distribution of said liquid on the exterior surface of said spinner, pump means in said conduit means for overcoming centrifugal force in said conduit means to cause said liquid to flow from said source to said point and stationary means for at will controlling the operation of said pump.

10. In an anti-icing system for a propeller spinner, a non-concentric source of de-icing liquid associated with and rotatable with said spinner, conduit means for said de-icing liquid leading to a point radially inward of said non-concentric source and externally of said spinner for distribution of said liquid on the exterior surface of said spinner, pump means in said conduit means for overcoming centrifugal force in said conduit means to cause said liquid to flow from said source to said point, means for actuating said pump de-icing power from the rotation of said hub, and stationary means for controlling said last named means.

GEORGE A. DEAN.

REFERENCES CITED

The following references are of record in the file of this patent:

UNITED STATES PATENTS

| Number | Name | Date |
|---|---|---|
| 2,129,565 | Clay | Sept. 6, 1938 |
| 2,150,521 | Siebenthaler | Mar. 14, 1939 |
| 2,278,716 | Vail | Apr. 7, 1942 |
| 2,343,918 | McCoy | Mar. 14, 1944 |
| 2,433,990 | Hardy | Jan. 6, 1948 |